US012253725B2

(12) United States Patent
Puffer et al.

(10) Patent No.: US 12,253,725 B2
(45) Date of Patent: Mar. 18, 2025

(54) SEALED OPTICAL TRANSCEIVER (71) Applicant: SAMTEC, INC., New Albany, IN (US)

(72) Inventors: Matthew Brian Puffer, Louisville, KY (US); Raymond Lee, Fremont (CA); R. Brad Bettman, Santa Clara, CA (US); Edwin Loy, Fremont, CA (US); Dyan Seville-Jones, San Jose, CA (US); Arlon Martin, Santa Barbara, CA (US); Stephen Michael Girlando, Colorado Springs, CO (US); Christopher Alan Bandfield, Colorado Springs, CO (US)

(73) Assignee: SAMTEC, INC., New Albany, IN (US)

( * ) Notice: Subject to any disclaimer, the term of this patent is extended or adjusted under 35 U.S.C. 154(b) by 278 days.

(21) Appl. No.: 17/424,052

(22) PCT Filed: Jan. 17, 2020

(86) PCT No.: PCT/US2020/013994
§ 371 (c)(1),
(2) Date: Jul. 19, 2021

(87) PCT Pub. No.: WO2020/150551
PCT Pub. Date: Jul. 23, 2020

(65) Prior Publication Data
US 2022/0350089 A1 Nov. 3, 2022

Related U.S. Application Data

(60) Provisional application No. 62/794,353, filed on Jan. 18, 2019, provisional application No. 62/897,105, (Continued)

(51) Int. Cl.
*G02B 6/42* (2006.01)
(52) U.S. Cl.
CPC ........ *G02B 6/4214* (2013.01); *G02B 6/4249* (2013.01); *G02B 6/4253* (2013.01)
(58) Field of Classification Search
CPC ... G02B 6/4214; G02B 6/4249; G02B 6/4253
(Continued)

(56) References Cited

U.S. PATENT DOCUMENTS 8,923,670 B2 12/2014 Zbinden et al.
2001/0004413 A1 6/2001 Aihara
(Continued)

FOREIGN PATENT DOCUMENTS

CN 1438504 A 8/2003
CN 101669055 A 3/2010
(Continued)

*Primary Examiner* — Jerry M Blevins
(74) *Attorney, Agent, or Firm* — BakerHostetler (57) ABSTRACT

This present disclosure seals the light propagation path in an optical interconnection element from external contaminants. The optical interconnection element includes a reflective surface, which can also be sealed from external contaminants Additional novel concepts include all enclosed sealed regions of the optical interconnection element being fluidly connected and making the final seal of the optical interconnection element with a thin plate, which can bend reducing the pressure differential between the ambient environment and the sealed internal volume of the optical interconnection element.

24 Claims, 7 Drawing Sheets

Related U.S. Application Data filed on Sep. 6, 2019, provisional application No. 62/933,158, filed on Nov. 8, 2019.

(58) Field of Classification Search
USPC .......................................................... 385/14
See application file for complete search history.

(56) References Cited

U.S. PATENT DOCUMENTS

| | | |
|---|---|---|
| 2003/0156327 A1 | 8/2003 | Terakawa et al. |
| 2004/0101020 A1 | 5/2004 | Bhandarkar |
| 2008/0193088 A1 | 8/2008 | Pfnuer |
| 2008/0226228 A1 | 9/2008 | Tamura et al. |
| 2011/0063713 A1 | 3/2011 | Kothari |
| 2011/0123150 A1 | 5/2011 | Zbinden et al. |
| 2011/0123151 A1 | 5/2011 | Zbinden et al. |
| 2011/0243509 A1 | 10/2011 | Wang et al. |
| 2014/0064676 A1 | 3/2014 | McColloch |
| 2016/0116368 A1 | 4/2016 | Cornelius et al. |
| 2016/0299302 A1 | 10/2016 | Sano |
| 2017/0075082 A1 | 3/2017 | Aihara et al. |
| 2017/0131488 A1 | 5/2017 | Yu et al. |
| 2017/0219786 A1 | 8/2017 | Morioka |
| 2018/0331493 A1 | 11/2018 | Lin et al. |
| 2019/0079253 A1 | 3/2019 | Koumans et al. |

FOREIGN PATENT DOCUMENTS

| | | | |
|---|---|---|---|
| CN | 203084244 U | 7/2013 | |
| CN | 105259622 A | 1/2016 | |
| CN | 106537205 A | 3/2017 | |
| CN | 106842439 A | 6/2017 | |
| CN | 109073843 A | 12/2018 | |
| EP | 1109041 A1 | 6/2001 | |
| TW | 201124749 A | 7/2011 | |
| TW | 201144883 A | 12/2011 | |
| WO | WO-2017152003 A1 * | 9/2017 | ............. G02B 6/262 |

* cited by examiner

Fig.7 ized metal enclosure having electrical feedthroughs. What is therefore needed is a low-cost optical transceiver with a sealed light propagation path compatible with operation immersed in a liquid.

SEALED OPTICAL TRANSCEIVER

CROSS-REFERENCE TO RELATED APPLICATIONS

This application is the National Stage Application of International Patent Application No. PCT/US2020/013994, filed Jan. 17, 2020 which claims priority to U.S. Patent Application Ser. No. 62/794,353 filed Jan. 18, 2019, U.S. Patent Application Ser. No. 62/897,105 filed Sep. 6, 2019, and U.S. Patent Application Ser. No. 62/933,158 filed Nov. 8, 2019, the disclosure of each of which is hereby incorporated by reference as if set forth in its entirety herein.

BACKGROUND

In a constant demand of network traffic growth, ASIC (application specific integrated circuit) switches, FPGAs (Field programmable gate arrays) or microprocessors are increasing their 10 (input/output) bandwidth capability and channel counts. The use of optical interconnects instead of electrical interconnects between the various high-bandwidth electrical components provides a significant gain in terms of bandwidth and bandwidth density (Gb/s/m$^2$ of surface area occupied by a transceiver). In particular, optical transceivers, which convert electrical signals to optical signals and optical signals to electrical signals, are often used to transmit high-bandwidth signals between electrical components. However, as the density of the interconnections increase, removing heat from components within the optical interconnection element becomes a greater challenge. One solution to component cooling is use of immersion cooling, where the optical interconnection elements, as well as other electrical components in the system, are submersed in a liquid. Direct liquid contact to the components results in a lower component operating temperature as compared to the commonly used forced air cooling. This results in improved component lifetime and greater system reliability. Moreover, immersion cooling allows higher packaging densities than can be obtained using air-cooling.

One impediment to adoption of immersion cooling is providing the capability of an optical interconnect element, such as an optical transceiver, to operate while immersed in a liquid. Most conventional optical transceivers typically are designed for operation with air cooling and will not work when immersed in a liquid due at least in part to the liquid interfering with optical propagation in the transceiver. While some conventional optical transceivers are capable of operation in a liquid, they tend to be bulky and expensive, since they enclose the transceiver elements in a hermetically sealed metal enclosure having electrical feedthroughs. What is therefore needed is a low-cost optical transceiver with a sealed light propagation path compatible with operation immersed in a liquid.

SUMMARY

In one aspect, an optical interconnection element can include an optical block having a light propagation path. The optical interconnection element can further include an electro-optic element aligned with the light propagation path. The optical interconnection element can further include a component cavity. A second light propagation path extends through the component cavity and is optically aligned with the first light propagation path in the optical block and the second light propagation path is sealed from the ambient environment such that environmental contaminants external to the optical block are prevented from reaching the second light propagation path.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

The present disclosure is directed at an optical interconnection element that is capable of operation while immersed in a cooling liquid. Operation while immersed in a cooling liquid improves heat removal from the optical interconnection element, allowing the optical interconnection element to be operated at a lower temperature or increasing the packaging density of systems with multiple optical interconnection elements. Additionally, the sealed optical interconnection element may be used without immersion cooling. It is particularly advantageous for use in harsh environments, such as dusty environments or environments where either fresh or salt water spray may be present. The optical interconnection element can be configured as an optical transceiver. Thus, in this description the term optical transceiver will generally be used; however, the invention may equally be applied to any suitable optical interconnection element, such as an optical transmitter or optical receiver. Thus, each of the optical transmitter and the optical receiver, and thus the optical transceiver, can be generally referred to as an optical interconnection element.

As used herein, the terms "substantially," "approximately," "about," and derivatives thereof and words of similar import as used herein recognizes that the referenced dimensions, sizes, shapes, directions, or other parameters can include the stated dimensions, sizes, shapes, directions, or other parameters and up to ±20%, including ±10%, ±5%, and ±2% of the stated dimensions, sizes, shapes, directions, or other parameters. Further, the term "at least one" stated structure as used herein can refer to either or both of a single one of the stated structure and a plurality of the stated structure. Additionally, reference herein to a singular "a," "an," or "the" applies with equal force and effect to a plurality unless otherwise indicated. Similarly, reference to a plurality herein applies with equal force and effect to the singular "a," "an," or "the."

References herein to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
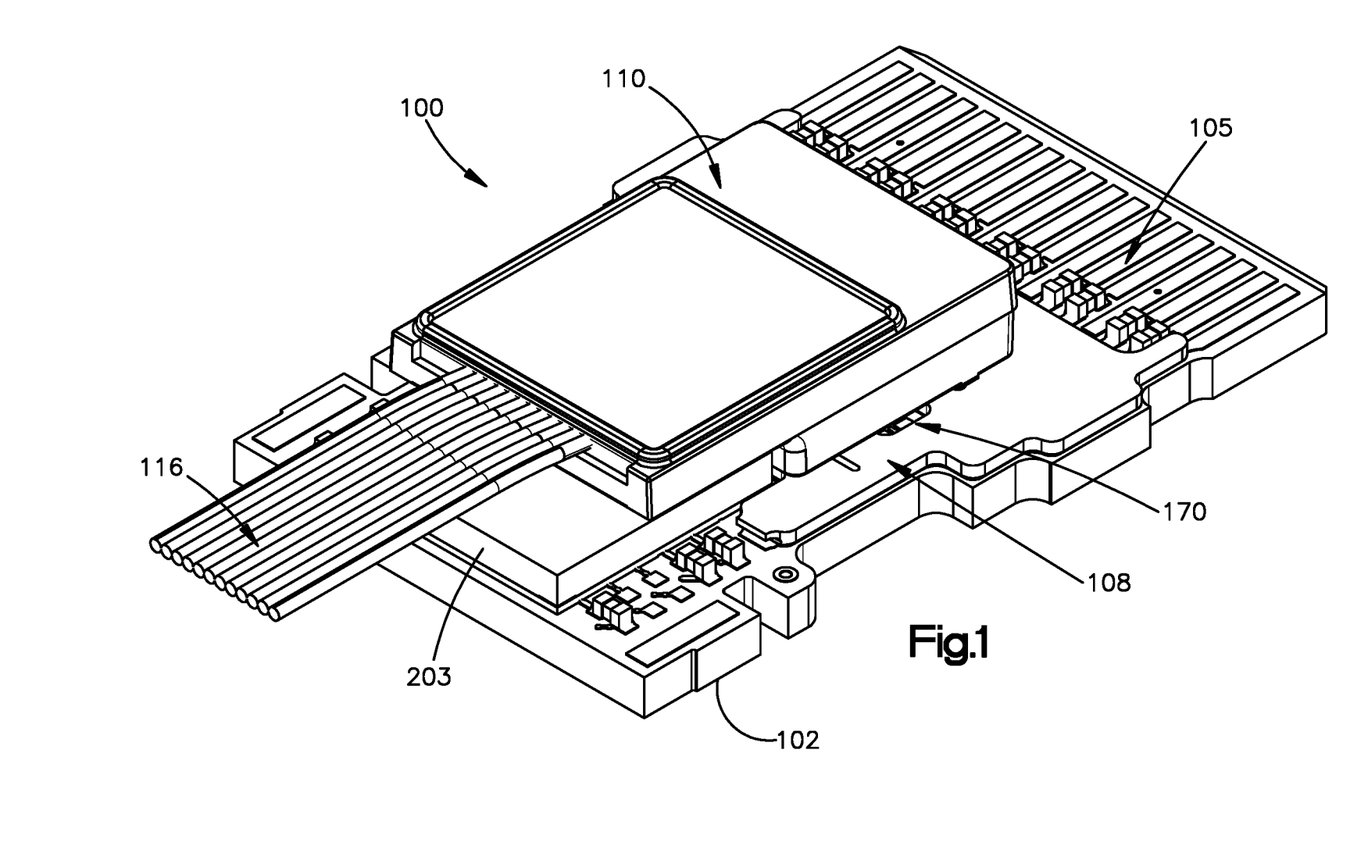
FIG. 1 is a perspective view of a sealed optical transceiver in accordance with one embodiment.
Figure 2:
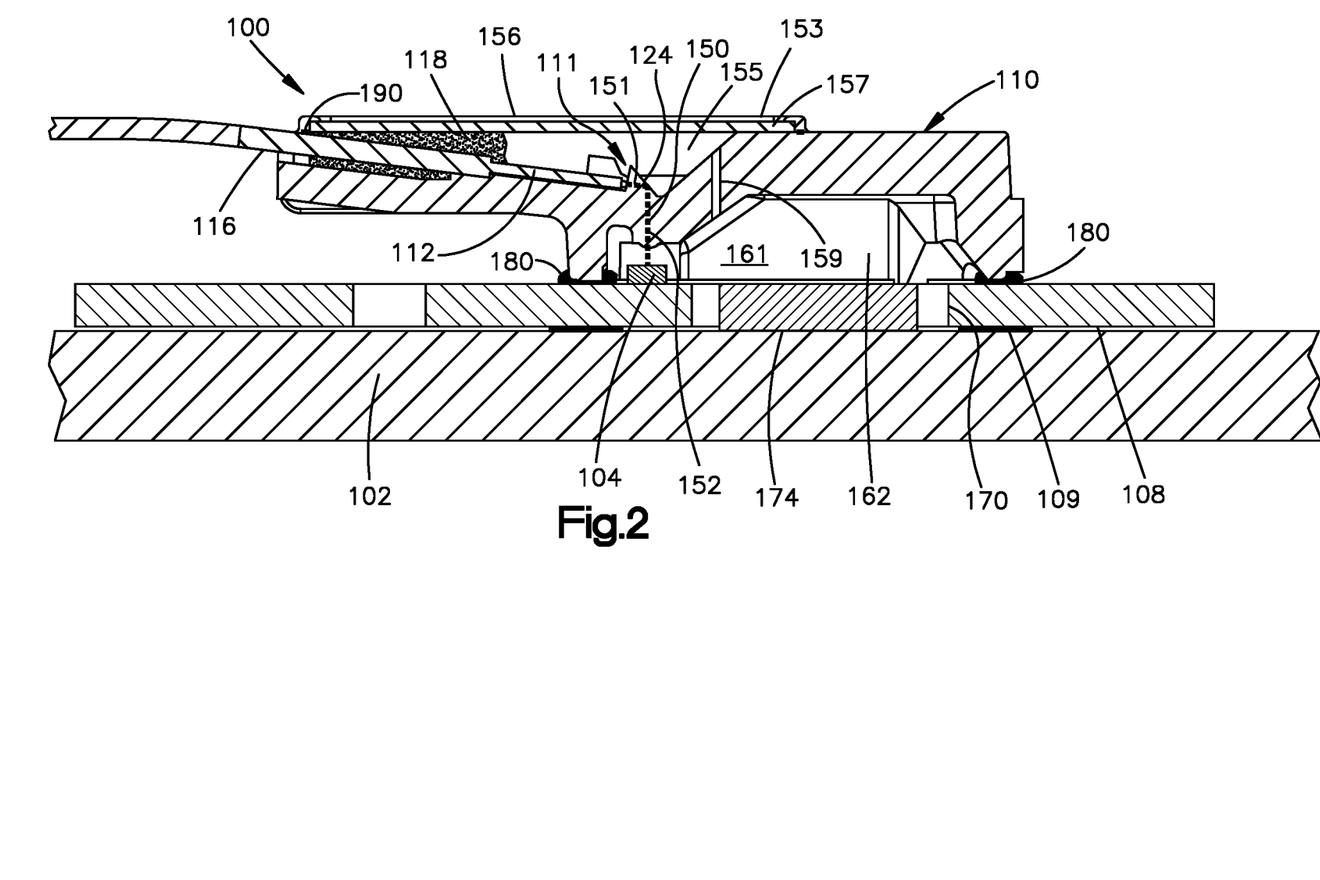
FIG. 2 is a cross-sectional view of the sealed optical transceiver illustrated in FIG. 1.

Referring to FIGS. 1-2, a sealed optical transceiver 100 includes a substrate 102, which can be configured as a printed circuit board (PCB), a riser 108, an optical block 110, and a plurality of optical fibers 112. The optical fibers 112 can be fixed with respect to each other inside a fiber ribbon cable 116. Alternatively, the optical fibers 112 can be loosely arranged in a loose fitting tube, and movable with respect to each other. Thus, the fibers 112 can be individually positionable with respect to the other fibers 112 when the fibers extend out the fiber ribbon cable 116. Alternatively still, the fibers 112 can be individualized without being surrounded by the fiber ribbon cable 116. In some examples, the optical transceiver 100 can be configured as a mid-board optical engine. As will be appreciated from the description below, various optical components are mounted to the riser 108 of substrate 102. The riser 108, in turn, is mounted to the substrate 102. The transceiver 100 includes a transmitter and a receiver. The transmitter receives electrical signals, generates optical signals corresponding to the electrical signals, and emits and transmits light that ultimately travels to optical fibers 112 of the fiber ribbon cable 116. The receiver receives optical signals, generates electrical signals corresponding to the optical signals, transmits the electrical signals to an electrical interface, that can be mated with a complementary electrical component. The electrical interface can be configured as electrical contact pads 105 of the substrate 102.

The transmitter includes at least one electro-optical element 104 such as at least one light source. The at least one light source can be arranged as a plurality of light sources. The light source can be placed in electrical communication with a controller 203, which can be configured as a microprocessor. The controller 302 can be mounted to the substrate 202, and can be programmed to control the operation of either or both of the optical transmitter and the optical receiver. In one example, the light source can be directly modulated by modulating an electrical current driving the light source. In another example, the transmitter can include at least one photonic integrated circuit, such as a plurality of photonic integrated circuits. In particular, the light sources can emit a steady beam of light that is externally modulated. The external modulation may occur in the photonic integrated circuit. Thus, the photonic integrated circuit, if present, can be configured to receive at least one electrical transmit signal from the complementary electrical component, convert the electrical transmit signal to an optical transmit signal, and output the optical transmit signal. In one example, the photonic integrated circuit can be configured as a silicon photonics chip.

The light source can be configured as a laser array in some examples. The laser array may be configured as a plurality of vertical-cavity surface-emitting laser (VCSEL) a distributed feedback (DFB) laser or a Fabry-Perot (FP) laser. The laser can be mounted to the riser 108. If a plurality of light sources are present, each light source may operate at a different wavelength or the light sources may be at substantially the same wavelength. The light source may be mounted directly on the photonic integrated circuit, if present, or can be mounted on the riser 108 or at some other location in the optical transceiver 20. If the light source is located off the photonic integrated circuit, the transmitter can include optical waveguides that direct light from the light source to the photonic integrated circuit.

The light source can modulate the light based on the received electrical transmit signals so as to produce the optical transmit signals. In particular, the transmitter can include at least one modulator driver that defines a modulation protocol that determines the modulation of the light based on the electrical signals received from the complementary electrical component. The transmitter can include a plurality of modulator drivers, with each modulator driver being dedicated to a respective channel that receives the electrical transmit signal to be converted into a respective optical transmit signal. The modulator drivers may be fabricated on a single die. Each modulator driver can be configured to provide an electrical input to the modulation circuit appropriate for driving either the drive current of the light source or an external optical modulator.

One or more intervening optical elements may be situated between the photonic integrated circuit and the fiber ribbon cable 116. These intervening optical elements may include one or more of mirrors, lenses, transparent substrates, transparent couplers, and optical waveguides that collectively serve to provide a light propagation path between the photonic integrated circuit waveguides and optical transmit fibers of the optical fibers 112 of the fiber ribbon cables 116 that are configured to receive the optical transmit signals.

During operation, the laser array emits light and transmits the light into the optical block 110. Light emitted by the laser array may be collimated by a first lens on a first surface of the optical block 110 where the emitted light from the laser array enters the optical block. The first surface of the optical block 110 can face the electro-optic element 104. The optical block 110 reflects light off a reflective surface 124 changing its propagation direction. An optional second lens on a second surface of the optical block 110. The second surface of the optical block 110 can define an exit surface of the optical block 110 in the transmitter. The second lens can focus light exiting the optical block 110. Light exiting the optical block 110 is focused into the core of the optical transmit fiber positioned proximate to the exit surface of the optical block 110. An index matching material can be disposed between the optical block 110 and the fiber end faces to eliminate or reduce back reflections from the fiber end faces.

The receiver can include at least one electro-optic element 104 such as at least one photodetector. The at least one photodetector can be configured as a plurality of photodetectors arranged as a photodetector array 104a (see FIG. 3A) that is in optical alignment with a plurality of optical receive fibers of the optical fibers 112 of the fiber ribbon cable 116. The photodetectors may be mounted to the riser 108. The receiver can further include a current-to-voltage converter that is in electrical communication with the at least one photodetector. For instance, the optical receiver can include a plurality of photodetectors of the array 104a that are in optical alignment with a respective one of the plurality of optical receive fibers. It can thus be said that the optical receive fibers are in data communication with the current-to-voltage converter.

The photodetectors are configured to receive optical receive signals from the respective optical receive fiber. As will be appreciated from the description below, the optical receive signals can travel from the optical receive waveguides to the photodetectors. The photodetectors may be surface sensitive photodetectors in which incoming photons strike an active region of the photodetector at a normal or near-normal angle of incidence. Such a detector architecture can be advantageous since it provides a small volume absorption region. Also, since the light is striking the active region at a normal or near-normal angle of incidence, the photodetector is polarization insensitive. The active region can have a low electrical capacitance, thereby allowing for high bandwidth operation. It should be appreciated, of course, that photodetectors having alternatively configured active regions are contemplated by the present disclosure. The surface sensitive active regions are configured to receive the optical receive signals from an output end of the respective one of the optical receive fibers.

One or more intervening optical elements may be situated between the optical receive fibers and the photodetectors. These intervening optical elements may include one or more of mirrors, lenses, transparent substrates, transparent couplers (polarization manipulators and filters), and optical waveguides that collectively serve to provide a light propagation path between the optical receive fibers 112 and the photodetectors 64. While the light propagation path is more complex in the embodiments using multiple optical elements, they may improve mode matching and relax alignment tolerances between the optical receive fibers and the photodetectors. The high coupling efficiency may advantageously be maintained over a large operating temperature range.

In some embodiments, the first lens can be situated on the opposing side of the photodetector die from the active region. The incoming optical receive signals pass through the first lens, the photodetector die, and are absorbed in the active region. The photodetectors are further configured to convert the optical receive signals to corresponding electrical receive signals. The electrical receive signals can have current levels that are proportional with an optical power level of the received optical receive signal. Generally the photo generated current increases as the intensity of the incoming optical receive signal increases, and decreases as the intensity of the incoming optical receive signal decreases. It is recognized that the current levels of the electrical receive signals are not necessarily linearly proportional to the optical power level of the received optical receive signal, and that often the proportionality is nonlinear. Thus, optical receive signals having a high optical power level will be converted to an electrical signal having higher current levels than optical receive signals having a lower optical lower level. Data may be transmitted by this modulated optical and electrical signal.

The photodetectors output the electrical transmit signals to respective channels of the current-to-voltage converter. The current-to-voltage converter outputs conditioned electrical transmit signals from the respective channels to corresponding electrical contacts at the electrical interface. In one example, the current-to-voltage converter can be configured as a transimpedance amplifier (TIA).

During operation, the optical receiver propagates light in an analogous manner as described above with respect to the optical transmitter, except in the opposite direction. In particular, light is emitted by a fiber end face of the optical transmit fibers and propagates into the optical block 110. In the optical block 110, the light reflects off the reflective surface 124 and is directed toward the photodetector. The receiver can further include the first lens on the first surface of the optical block 110, which can define an exit surface of the receiver. The first lens of the receiver focuses received light on to the photodetector. The receiver can further include the second lens on the second surface of the optical block surface where the light enters the optical block 110 from the optical fibers 112. The second lens can be configured to collimate the light that enters the fibers 112.

Referring now to FIG. 2, the riser 108 may be formed from a metal, such as plated copper to facilitate heat transfer from heat generating elements, such as the laser array. In this regard, the riser 108 can also be referred to as a heat spreader. The riser has a riser hole 170, which is covered by the optical block 110 when the transceiver 100 is assembled. The riser hole 170 a centrally located hole of the riser 108. The optical block 110 may be formed from a molded polymer, such as ULTEM™.

Referring now to FIG. 2, the optical transceiver 100 defines an optical path 150 between a fiber end face and the electro-optic element 104. As will be appreciated from the description below, light traveling along at least a portion of the optical path 150 can undergo free space propagation in a gas such as air between the fiber end face and the electro-optic element 104. As described above, the electro-optic element 104 can be configured as a light source of the transmitter, and can be configured as a photodetector of the receiver. In practice, the optical transceiver 100 can include a pair of electro-optic elements 104, one of the electro-optic elements being configured as at least one light source, and the other electro-optic elements being configured as at least one photodetector. Thus, the electro-optic element 104 illustrated in FIG. 2 is intended to schematically illustrate both the light source and the photodetector. The optical transceiver 100 can thus define a transmit light propagation path and a receive optical path 150 of the type described above. The transmit light propagation path extends from the light source or laser to the fiber end face. The receive light propagation path extends from the fiber end face to the photodetector or photodiode. Thus, while the optical path 150 is described in more detail below with respect to the receiver of the optical transceiver 100, the optical path 150 can be equally applicable to the transmitter of the optical transceiver 100. Thus, reference is made below interchangeably to a receiver, transmitter, and transceiver. The optical path 150 defines a first section 151 that extends from the fiber end faces to the reflective surface 124, and a second section 152 that extends from the reflective surface 124 to the electro-optical element 104. Thus, the electro-optical element 104 is in alignment with the light propagation path, and in particular with the second section 152 of the light propagation path.

As shown in FIG. 2, the riser 108 is mounted onto a top surface of the substrate 102, and the optical block 110 is mounted to a top surface of the riser 108. Thus, the substrate 102 supports the riser 108, and the riser 108, in turn, supports the optical block 110. The riser 108 can provide a thermal dissipation path for heat generated by the transceiver 100. The sealed optical transceiver 100 can further include a fiber ribbon cable 116 having one or more optical fibers 112 that are supported relative to the optical block 110, such that a first at least one of the fibers 112 are configured to transmit optical signals from the optical transmitter of the transceiver 100, and others of the fibers 112 are configured to receive optical signals from the optical receiver of the transceiver 100. The optical fibers 112 may be mounted in a fiber alignment structure to facilitate simultaneous alignment of multiple optical fibers 112 with the optical block 110.

The optical block 110 defines a first cavity 155 that is disposed adjacent the reflective surface 124, such that the reflective surface 124 is open to the first cavity 155. The second lens can be disposed in the first cavity 155. Thus, the first cavity 115 can also be referred to as a second lens cavity that includes the second lens. The optical block 110 defines an outer surface that defines an opening 153 to the first cavity 155. The outer surface can be defined by a top surface of the optical block 110 opposite a bottom surface of the optical block 110 that faces the riser 108. Of course, the opening 153 can be defined on any suitable surface of the optical block 110 as desired. The reflective surface 124 can be configured as a total internal reflection (TIR) surface. The first cavity 155 is typically occupied by a material having a refractive index near 1, such as air or dry nitrogen. Total internal reflection (TIR) on the reflective surface 124 occurs when the refractive index of the optical block 110, typically in the range of 1.45 to 1.7, is larger than the refractive index in the first cavity 155. If a liquid were to contact the reflective surface 124 when the reflective surface is configured as a TIR surface, it may spoil the TIR reflection and thus affect the operation of the optical transceiver 100. When the reflective surface 124 is configured as a TIR surface, the first cavity 155 can be referred to as a TIR cavity.

In other examples, a portion of the optical block 110 can be coated with a metallic coating so as to define a metallic surface that, in turn, defines the reflective surface 124. In one example, the metallic coating can be gold, though it is appreciated that any suitably optically reflective metallic material can be used. The light reflects off the metallic reflective surface changing its propagation direction. When the reflective surface 124 is metallic, the reflection is not spoiled by liquid contacting the reflective surface 124.

With continuing reference to FIG. 2, and as described above, the optical path 150 includes the first section 151 and the second section 152. The reflective surface 124 redirects the light between the first and second sections 151 and 152. The first section 151 of the optical path 150 can include a first portion that undergoes free space propagation portion from the end face of the optical fiber 112 to an internal surface of the optical block 110. The first section 151 of the optical path 150 can include a second portion that extends from the internal surface of the optical block 110 to the reflective surface 124. The second section 152 of the optical path 150 can include a first portion that resides in the optical block 110, and extends from the reflective surface 124 to the bottom surface of the optical block 110. The second section 152 of the optical path 150 can include a second portion that undergoes free space propagation from the bottom surface of the optical block 110 to the electro-optic element 104.

Thus, the optical path 150 can define a first free space light propagation path, through a gas such as air, whereby the light undergoes free space propagation from the end face of the optical fibers 112 to the internal surface of the optical block 110. The first free space light propagation path can be defined by the first portion of the first section 151 of the optical path 150. The optical path 150 further defines an internal light propagation path, whereby the light undergoes free space propagation inside the optical block 110. Collectively, the internal light propagation path can include the second portion of the first section 151 of the optical path 150 and the first portion of the second section 152 of the optical path 150 that each reside in the optical block 110. The optical path 150 can further include a second free space light propagation path, through a gas such as air, that extends from the optical block 110 to the electro-optic element 104, whereby the light undergoes free space propagation. The second free space propagation portion can be defined by the second portion of the second section 152 of the optical path. The second free space light propagation path can extend from a bottom surface of the optical block 110 to the electro-optic element 104. Light is either emitted or absorbed by the electro-optic element (EO) 104, which is mounted on the riser 108. The second free space light propagation path is optically aligned with both the first light propagation path extending through the optical block 110 (and in particular the first portion of the second section 152 of the optical path 150), and the electro-optic element 104.

While the optical transceiver 100 defines the first free space light propagation path as described above, it is recognized that the end face of the optical fibers 112 can be butted against the optical block 110 in another example. Accordingly, in this example, the optical transceiver 100 can be constructed such that the optical path does not undergo free space propagation between the optical fibers and the internal surface of the optical block 110. Thus, the optical path 150 can define the internal light propagation path that is defined by the first section 151 of the optical path and the first portion of the second section 152 of the optical path. Further, the optical path 150 can define a free space light propagation path that is defined by the second portion of the second section 152 of the optical path 150 as described above.

With continuing reference to FIG. 2, the optical transceiver 100 defines a second cavity 162, which can also be referred to as a component cavity. The component cavity 162 extends from the optical block 110 to the riser 108, and also to the electro-optic element 104 that is mounted on the riser 108. In the receiver, light travels from the optical block 110 and through the component cavity 162 to the electro-optic element 104. In the transmitter, light travels from the electro-optic element 104 through the component cavity 162 to the optical block 110. The component cavity 162 can be defined by the optical block 110, and in particular the bottom surface of the optical block 110, and the riser 108, and in particular the top surface of the riser 108. The first lens can be disposed in the component cavity 162. Thus, the component cavity 162 can thus also be referred to as a first lens cavity.

Generally, the component cavity 162 may be considered to be any volume or region which is filled with a gas, air, or evacuate, where an optical propagation path exists to or from an electro-optic element to an optical element. In this example, the optical element is defined by the optical block 110. Within the optical block 110 light may travel in the first section 151 of the optical path 150 and in the first portion of the second section 152 of the optical path 150. At the reflective surface 124 the propagation direction of light changes due to reflection off the reflective surface 124.

In order for operation of the optical transceiver 100 to be unaffected by immersion of the transceiver 100 in liquid, particularly when the liquid is not optically transparent, the liquid is prevented from interfering with the first free space light propagation path between the end face of the optical fibers 112 and the internal surface of the optical block 110. Further, as will be described in detail below, the liquid is prevented from interfering with the second free space light propagation path.

When the reflective surface 124 is configured as a TIR surface, the liquid can be prevented from entering the first cavity 155. If a liquid were to enter the first free space light propagation path and contact the TIR surface, the optical properties of the first free space light propagation path would be altered, thereby affecting operation of the transceiver 100. Accordingly, as described in more detail below in accordance with one example, the optical transceiver 100 can define a liquid impermeable first cavity seal that prevents the liquid from entering the first cavity 155 when the optical transceiver 100 is immersed in the liquid.

The first cavity seal can include a filler material 118 that can be in contact with both the optical block 110 and the optical fiber 112 in the first cavity 155. In particular, the optical coupler defines a fiber opening, such that the optical fibers 112 enter the optical block 110 through the fiber opening. The filler material 118 can seal an interface between the optical fibers 112 and the optical coupler 110, thereby providing a water impermeable seal that prevents liquid from entering the first cavity 155 through the fiber opening when the optical transceiver 100 is immersed in the liquid. The filler material 118 can be made of any suitable material. In one example, the filler 118 is an epoxy. It can be desirable for the epoxy to be dimensionally stable upon curing. Further, as described in more detail below, the optical transceiver 100 can include a closure member 156 that seals the opening 153 to the first cavity 155. The closure member 156 in combination with the filler material 118 can define the first cavity seal, and prevents liquid from entering the first cavity 155 when the transceiver 100 is immersed in the liquid. Thus, the liquid is prevented from contacting the reflective surface 124.

However, it is recognized that when the reflective surface 124 is metallic, contact between the liquid and the reflective surface 124 does not affect the reflection of the light between the first and second sections 151 and 152 of the optical path 150. Therefore, liquid in the first cavity 155 does not affect the reflective properties of the reflective surface 124 when the reflective surface 124 is metallic. It would also be desirable to prevent liquid in the first cavity 155 from interfering with the first free space light propagation path, such that the first cavity 155 can be unsealed with respect to liquid when the optical transceiver 100 is disposed in the liquid. Thus, the optical transceiver 100 can be devoid of the closure member 156 when the reflective surface 124 is metallic.

Figure 7:
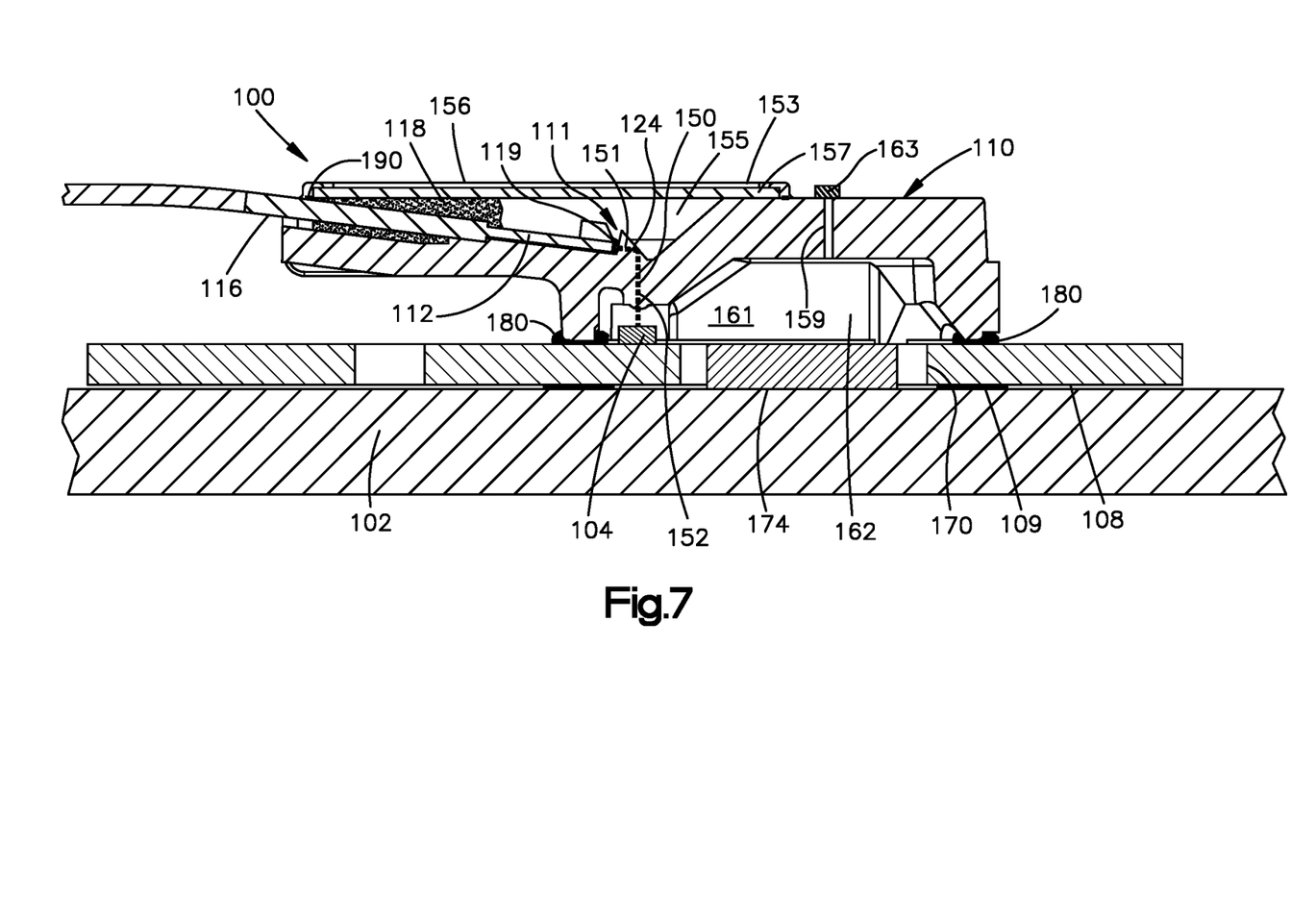
FIG. 7 is a cross-sectional view of the transceiver similar to FIG. 2, but constructed in accordance with an alternative embodiment.

Referring now to FIG. 7, the fiber termination gap 111 can be sealed so as to prevent liquid in the first cavity 155 from traveling to the first free space light propagation path when the first cavity 155 is unsealed. In particular, the optical transceiver 100 can include an optically transparent filler material 119 that seals the fiber termination gap 111. The optically transparent filler material 119 may be an optically transparent epoxy or adhesive that seals a fiber termination gap 111 that extends from the end face of the optical fiber 112 and one of the internal surface of the optical block 110 and the metallized reflective surface 124. Thus, the first free space propagation path extends through the filler material 119. It can be desirable for that optically transparent filler material 119 to be dimensionally stable to as to maintain alignment between the end faces of the optical fibers 112 and the reflective surface 124. The optically transparent filler material 119 may be an index matching material such that optical reflections at the optical fiber end face and the second surface of the optical block 110 are sufficiently low or minimized. For instance, the optically transparent filler material 119 can have a refractive index between that of the optical fibers 112 and the optical block 110. The optically transparent filler material 119 is configured to isolate the first free space light propagation path from its surrounding environment. Thus, if the first cavity 155 is not liquid sealed, the optically transparent filler material 119 prevents the liquid that enters the first cavity 155 from interfering with the free space propagation of light in the first cavity 155. Thus, optical signals can propagate through the filler 119 selectively to the optical fibers 112 in the transmitter, and from the fibers 112 in the receiver.

Thus, it is recognized in some examples that the first cavity 155 can be unsealed with respect to liquid when the optical transceiver 100 is immersed in the liquid. Further, as will be described in more detail below, the first cavity 155 can be isolated from the component cavity 162 with respect to fluid flow therebetween in some examples. Thus, the liquid in the first cavity 155 is prevented from flowing from the first cavity to the component cavity 162.

While it is appreciated that the optically transparent filler material 119 can have particular utility when the reflective surface 124 is metallic, it can nevertheless be desirable for the optical transceiver to include the optically transparent filler material 119 when the reflective surface defines a TIR surface and the first cavity 155 is sealed. Further, while the first cavity 155 can be unsealed when the reflective surface 124 is metallic, it is recognized that the first cavity 155 can also be sealed in the manner described herein when the reflective surface is metallic.

In order for light propagation through the transceiver 100 to be unaffected by immersion in liquid, particularly when the liquid is not optically transparent, the liquid is further prevented from interfering with the second free space light propagation path in the component cavity 162. In one example, the optical transceiver 100 can define a liquid impermeable component cavity seal that prevents the liquid from entering the component cavity 162 when the optical transceiver 100 is immersed in the liquid. Thus, the liquid is prevented from entering the component cavity 162, and is thus prevented from entering second free space light propagation path, thereby sealing the second free space light propagation path from the ambient environment such that environmental contaminants external to the optical block 110 are prevented from reaching the second free space light propagation path. The sealed optical transceiver 100 is configured to achieve liquid isolation from the light propagation path when the optical transceiver 100 is immersed in a liquid. For instance, as described in more detail below, the transceiver 100 can define a first liquid-impermeable seal between the riser 108 and substrate 102, and a second liquid-impermeable seal between the optical block 110 and the riser 108, thereby preventing liquid from traveling into the component cavity 162, and thus into the second free space light propagation path, through both a first gap between the substrate 102 and the riser 108, and a second gap between the riser 108 and the optical block 110.

In one aspect, the optical block 110 defines a conduit 159 that extends from the component cavity 162 and the first cavity 155. The conduit 159 places the component cavity 162 and the first cavity 155 in fluid communication with each other. Thus, the conduit 159 provides a path for gas exchange between the component cavity 162 and the first cavity 155. The conduit 159 also allows the component cavity 162 to vent to the surrounding atmosphere through the opening 153. The component cavity 162, first cavity 155 and conduit 159 may be considered to form a contiguous, environmentally isolated, volume 161 where gas can be freely exchanged between them. Any method of making the component cavity 162 and first cavity 155 contiguous may be used.

The transceiver 100 can include the closure member 156 that is secured to the optical block 110 so as to seal the first cavity 155 with respect to the opening 153. The closure member 156 can be configured as a plate 157 that extends across the first cavity so as to close and seal the first cavity 155. In particular, the plate 157 can close the opening 153 to the first cavity 155 at the external surface of the optical block 110. Thus, when the first cavity 155 and the component cavity 162 are in fluid communication with each other, the closure member 156, the seal between the substrate 102 and the optical block, and the seal between optical block 110 and the riser 108 can combine to define the liquid impermeable component cavity seal.

The closure member 156 be sealed to the optical block 110 in a final assembly step. Accordingly, gasses produced during fabrication of the optical transceiver 100 can travel from the component cavity 162 through the conduit 159, and out the first cavity 155 through the opening 153. For instance, outgassing of water vapor or chemical components or solvents in the adhesive or any of the components such as the substrate 102 and the optical block 110 can occur. Once the gasses have evacuated the optical transceiver through component cavity 162 the conduit 159, and the first cavity 155, the opening 153 can be sealed by the closure member 156. The closure member 156 is configured to isolate the reflective surface 124 from the surrounding environment. That is if the sealed optical transceiver 100 is immersed in a liquid, the closure member 156 will keep the reflective surface 124 free of contamination by the liquid. In particular, the closure member 156 will prevent the liquid from entering the first cavity 155 through the opening 153 when the optical transceiver 100 is immersed in the liquid. While the closure member 156 can be configured as a plate 157 in one example, the closure member 156 can be alternatively configured in any suitable manner as desired.

Referring now to FIG. 7, it is recognized that the conduit 159 need not place the component cavity 162 in fluid communication with the first cavity 155. Thus, the first cavity 155 and the component cavity 162 can be isolated from each other with respect to fluid flow therebetween. Instead, the conduit 159 can extend from the component cavity 162 to an external surface of the optical block 110 that is open to the ambient environment. The external surface can be defined by the top surface of the optical block 110 or any other suitable external surface. The conduit 159 can be open to the external surface of the optical block 110, thereby placing the component cavity 162 in fluid communication with the ambient environment without passing through the first cavity 155. Thus, during fabrication of the optical transceiver 100, gas produced can travel from the component cavity 162 through the conduit 159, and out the optical block 110.

Whether the conduit 159 terminates at the external surface of the optical block or terminates at the first cavity 155, it can be said that the conduit 159 is in fluid communication with the ambient environment. Once the gasses have evacuated the optical transceiver 100 through the conduit 159, the conduit 159 can be sealed from the ambient environment with a liquid impermeable seal. In particular, the conduit 159 can be sealed at the external surface of the optical block 110 by a conduit closure member 163. The conduit closure member 163 is configured to isolate the conduit 159, and thus the component cavity 162, from the surrounding environment. Thus, when the sealed optical transceiver 100 is immersed in a liquid, the conduit closure member 163 will keep the free space propagation that occurs in the component cavity 162 free of contamination by the liquid. In particular, the conduit closure member 163 will prevent the liquid from entering the conduit 159, and thus, the component cavity 162, when the optical transceiver 100 is immersed in the liquid. While the conduit closure member 163 can be configured as a plate in one example, the conduit closure member 163 can be alternatively configured in any suitable manner as desired.

As described above, the sealed optical transceiver 100 further seals the component cavity 162 from the liquid when the transceiver 100 is immersed in the liquid. In particular, the transceiver 100 can define a first liquid-impermeable seal between the riser 108 and substrate 102. The transceiver 100 can further define a second liquid-impermeable seal between the optical block 110 and the riser 108. The first and second seals are liquid-impermeable at least to the extent that when the transceiver 100 is immersed in the liquid, the first seal prevents the liquid from entering between the riser 108 and the substrate 102, and the second seal prevents the liquid from entering between the optical block 110 and the riser 108.

Figure 3A:
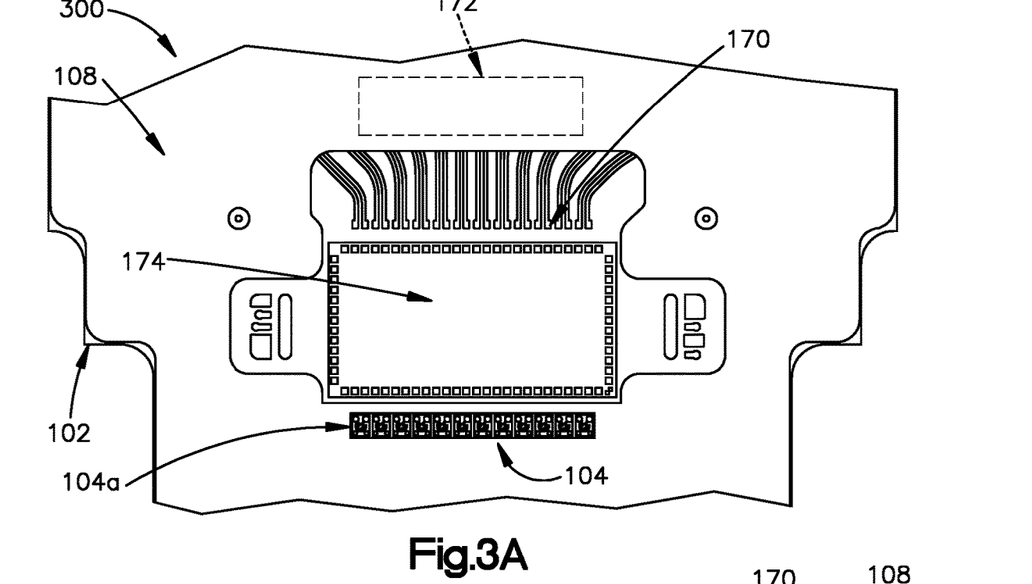
FIG. 3A is a top plan view of a partially assembled optical receiver of the sealed optical transceiver illustrated in FIG. 2, showing a riser mounted to a substrate.
Figure 3B:
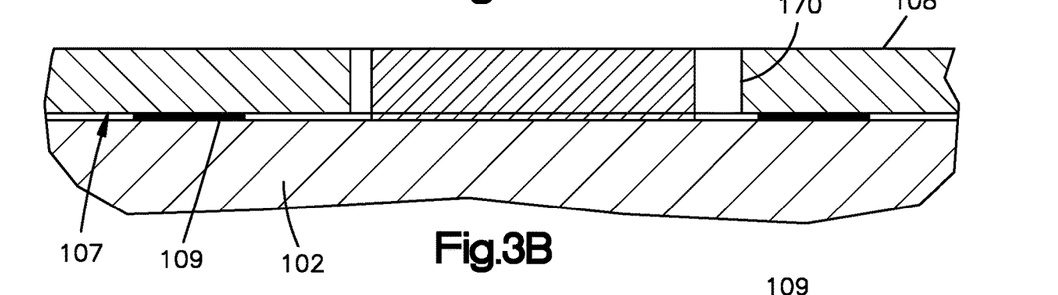
FIG. 3B is a sectional side elevation view of a portion of the partially assembled optical receiver illustrated in FIG. 3A, showing the riser sealed to the substrate.
Figure 3C:
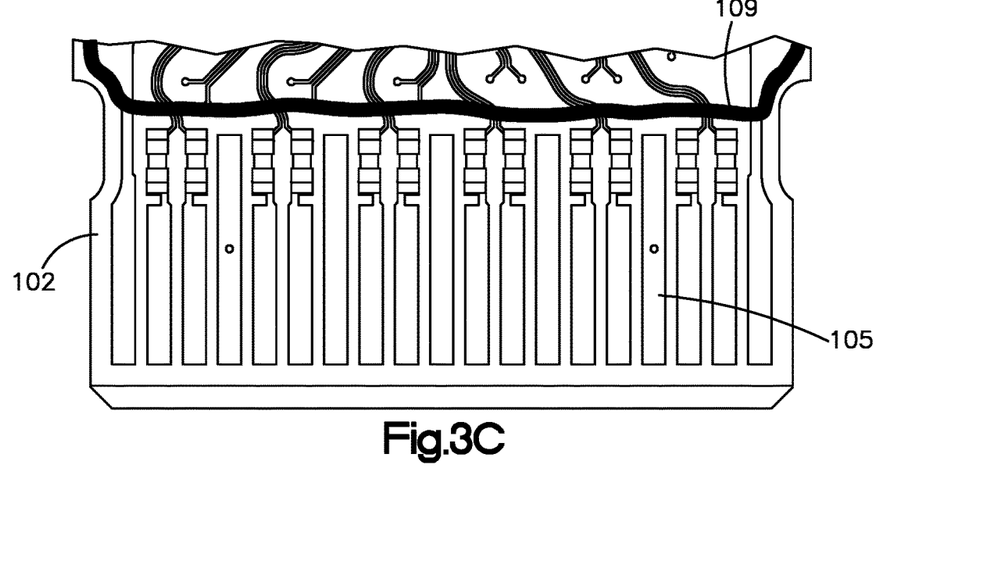
FIG. 3C is a top plan view of a substrate showing an adhesive configured to seal a gap between the substrate and the riser.

The first seal between the riser 108 and substrate 102 may defined by at least one or both of solder and adhesive. FIGS. 3A-3C shows an image of the riser 108 mounted to the substrate 102 of an optical receiver 300. FIG. 3A shows the top surface of the riser 108. The bottom surface of the riser 108 may be sealed to the top surface of the substrate 102. The current-to-voltage converter, which can be configured as a transimpedance amplifier (TIA) 174, may be disposed in a riser hole 170 of the riser 108. The riser hole 170 can be a central hole of the riser 108. The TIA 174 can be in electrical communication with electrical signal traces of the substrate 102 by wire bonds or any suitable alternative electrical connection. Similarly, the TIA 174 can be in electrical communication with the photodetector array 104a by wire bonds or any suitable alternative electrical connection. The photodetector array 104a can be supported by the riser 108. For instance, in one example, the photodetector array 104a can be adhesively attached to the riser 108.

At least a portion of the bottom surface of the riser 108 may be soldered to the top surface of the substrate 102 so as to define a solder joint at a solder region. Thus, the optical transceiver 100 can provide a continuous, low thermal impedance, heat transfer path from the photodetector array 104a to the substrate 102 to facilitate heat removal. The solder region may surround at least a portion of the riser hole 170, such as a majority of the riser hole 170 up to an entirety of the riser hole 170. The integrity of the solder joint may be assessed using x-ray or any suitable inspection.

The substrate 102 defines a bridge region 172 defined as a location whereby electrical signal traces of the substrate 102 pass under the riser 108. The optical transceiver 100 can define a riser gap 107 between the riser 108 and substrate 102 that can be filled with a suitable adhesive, such as a low viscosity adhesive 109. The adhesive 109 can be an epoxy in some examples. It can be desirable for the epoxy to be resilient against harsh environments, and further to have a low dielectric constant so as to not impede high speed performance of the optical transceiver 100. As shown in FIG. 3C, the adhesive 109 can seal the bridge region 172 with respect to liquid when the optical transceiver 100 is immersed in the liquid. In particular, the adhesive 109 can be applied to at least one of the top surface of the substrate 102 and the bottom surface of the riser 108 at a location adjacent the bridge region 172. The riser 108 can then be mounted to the riser 108, and the adhesive 109 can cure so as to define a liquid impermeable seal at the bridge region 172. Thus, liquid is prevented from penetrating the seal and flowing into the bridge region 172 between the riser 108 and the substrate 102 when the transceiver 100 is immersed in the liquid.

The riser gap 107 can be defined along a vertical direction that separates top surfaces from bottom surfaces. The adhesive 109 can be introduced into the gap 107 in any suitable manner as desired. For instance, in one example, capillary action may be used to draw the adhesive into the gap 107. Further, as shown in FIG. 3B, the adhesive 109 can extend continuously and uninterrupted about the riser hole 170. After introducing the adhesive into the gap 107, the adhesive 109 may be cured. Alternatively, electrical traces on the substrate 102 can be buried beneath the top surface of the substrate 102 and a continuous seal can be formed around the riser hole 170 of the riser 108. For instance, a solder joint can be formed around the riser hole 170 that joins the riser 108 to the substrate 102. Thus, it may be said that the riser 108 may be mounted to the substrate 102 such that a liquid-impermeable seal surrounds the riser hole 170 in the gap 107 between the substrate 102 and the riser 108. Thus, when the optical transceiver 100 is immersed in the liquid, the liquid is prevented from penetrating the liquid-impermeable seal and flowing into the gap 107.

As described above, the transmitter of the transceiver can be liquid impermeable in the manner described herein with respect to the receiver. In particular, for a transmitter, the TIA 174 is replaced by a light source driver, and the photodetector array 104a s replaced by a light source. For instance, the light source can be defined by a laser array, and the light source driver can be configured as a laser driver. In the optical transceiver 100, a photodetector array and laser array are both present, as are a laser driver and TIA. These components may be scaled in size so that both the laser driver and TIA fit within the riser hole 170 of the riser 108. Both the photodetector array and the laser array may be scaled so that they both may be mounted adjacent the riser central hole 170. Alternatively, the riser central hole 170 may be enlarged such that the photodetector array and the laser array both fit within the riser hole 170 of the riser 108, such that the riser hole 170 accommodates the components for both the transmitter and the receiver. In still other embodiments, the riser 108 can define first and second riser holes. The laser driver can be disposed in the first riser hole, and the TIA can be disposed in the second riser hole.

Figure 4A:
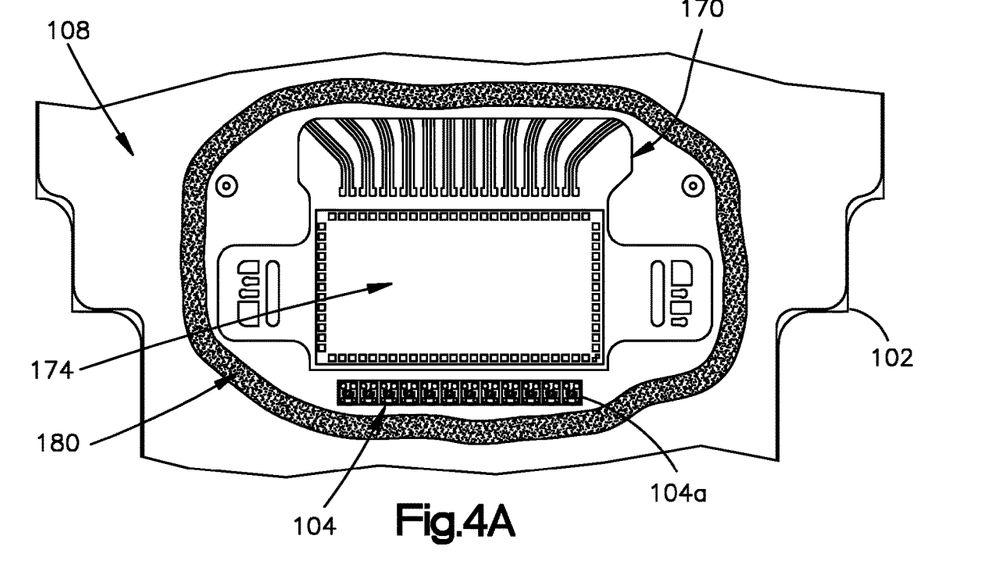
FIG. 4A shows an adhesive bead applied to a riser of the sealed optical receiver illustrated in FIG. 3A.
Figure 4B:
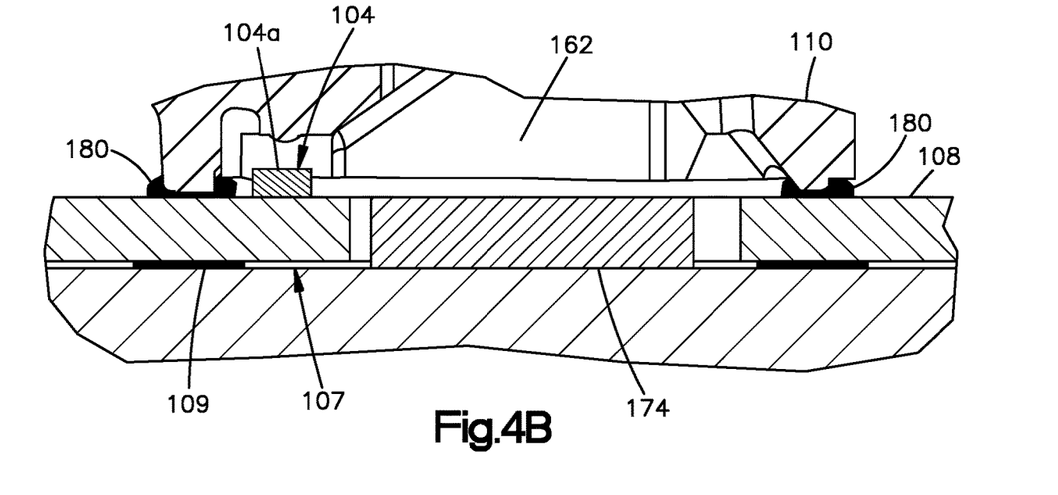
FIG. 4B shows the optical block of the optical block receiver sealed to the riser illustrated in FIG. 4A, shown after the adhesive bead has been cured.

Referring now to FIGS. 4A-4B, the optical block 110 can be mounted to the riser 108. For instance, the optical block 110 can be sealed to the riser 108. In particular, an adhesive 180 can be applied to either or both of the top surface of the riser 108 or the bottom surface of the optical block 110 that faces the top surface of the riser 108. The adhesive 180 surrounds the riser hole 170 of the riser 108. In one example, the adhesive is applied to the top surface of the riser 108 as a continuous uninterrupted bead of adhesive 180 that surrounds an entirety of the perimeter of the riser hole 170. The optical block 110 can be mounted on the top surface of the riser 108 such that the adhesive bead 180 is disposed between the optical block 110 and the riser 108, thereby defining a sealed interface that attaches the optical block to the riser 108. In one example, the optical block 110 can be positioned on the adhesive bead after the adhesive bead 180 has been applied to the top surface of the riser 108.

The optical block 110 may be aligned with the riser 108 in accordance with conventional automated techniques used to assemble existing optical transceivers. Once the optical block 110 is properly aligned with the riser 108 and positioned on the riser 108, the adhesive bead 180 may be cured, thereby fixing the position of the optical block 110 relative to the riser 108. The adhesive bead 180 can be cured using any known method, such as ultra-violet light curing, heat curing, time curing, or any combinations thereof. The adhesive used in the adhesive bead 180 may have a relatively high viscosity, so that it will accommodate and conform to varying gap sizes between the optical block 110 and riser 108 arising from optical alignment of the optical block 110. The adhesive can be an epoxy in some examples. It can be desirable for the adhesive bead 180 can be dimensionally stable after curing, thereby preventing substantial movement of the optical block with respect to the riser 108 and electro-optic component 104. It can also be desirable for the adhesive bead 180 to be resilient to harsh environments. Thus, it may be said that the optical block 110 can be mounted to the riser 108 such that a liquid impermeable seal is disposed in a gap between the optical block 110 and the riser 108 and also surrounds the component cavity 162. Thus, when the transceiver 100 is immersed in the liquid, the liquid is prevented from penetrating the seal and flow through the gap between the optical block 110 and the riser 108 and into the component cavity 162. Excess adhesive can be evident along the entire perimeter of the optical block 110 indicating that the adhesive defines a continuous and uninterrupted seal.

As described above, the optical block 110 further defines the at least one conduit 159 that extends from the first cavity 155 to the component cavity 162. In one example, the at least one conduit extends from the top surface of the optical block 110 to the bottom surface of the optical block 110. Thus, the top end of the conduit 159 is open to the first cavity 155 (see FIG. 2), and the bottom end of the conduit 159 is open to the component cavity 162. Accordingly, the conduit 159 provides a continuous passage from the component cavity 162 to the first cavity 155. Further, as described above, the first cavity 155 is open to the ambient environment during assembly of the transceiver 100. The first cavity 155 can be defined by the top surface of the optical block 110. Thus, the at least one conduit 159 can similarly extend through the top surface of the optical block 110. Further, the component cavity 162 can be defined by the bottom surface of the optical block 110. Thus, the at least one conduit 159 can extend through the bottom surface of the optical block 110. The component cavity 162 is sealed against the riser 108 by the adhesive bead 180 in the manner described above.

As a result, the component cavity 162 can equilibrate with the pressure of the ambient environment through the conduit 159 and the first cavity 155 once the optical block 110 has been secured to the riser 108. This avoids trapping gases in the component cavity 162 during the steps of aligning the optical block 110 and securing the optical block 110 to the riser 108. Trapped gases could otherwise cause pressure differentials between the component cavity 162 and the ambient environment, which could cause misalignment and compromise the seal between the riser 108 and optical block 110. The at least one conduit 159 can be made by laser machining, or any suitable alternative method as desired. The at least one conduit 159 is disposed at a location of the optical block 110 so that it does not interfere with any of the light propagation paths that pass through the optical block 110. In one example, the at least one conduit 159 can include a pair of conduits 159. The conduits can be positioned such that the optical fibers 112 are disposed between the conduits 159 with respect to a row direction along which the optical fibers 112 are arranged. That is, the optical fibers 112 can be arranged adjacent each other along the row direction. Each of the conduits 159 can be disposed outboard of the optical fibers 112 with respect to the row direction. However, it is appreciated that the conduits 159 can be alternatively positioned as desired. The conduits 159 can be cylindrical in shape in one example. However, the conduits 159 can define any suitable alternative shape as desired.

Figure 5:
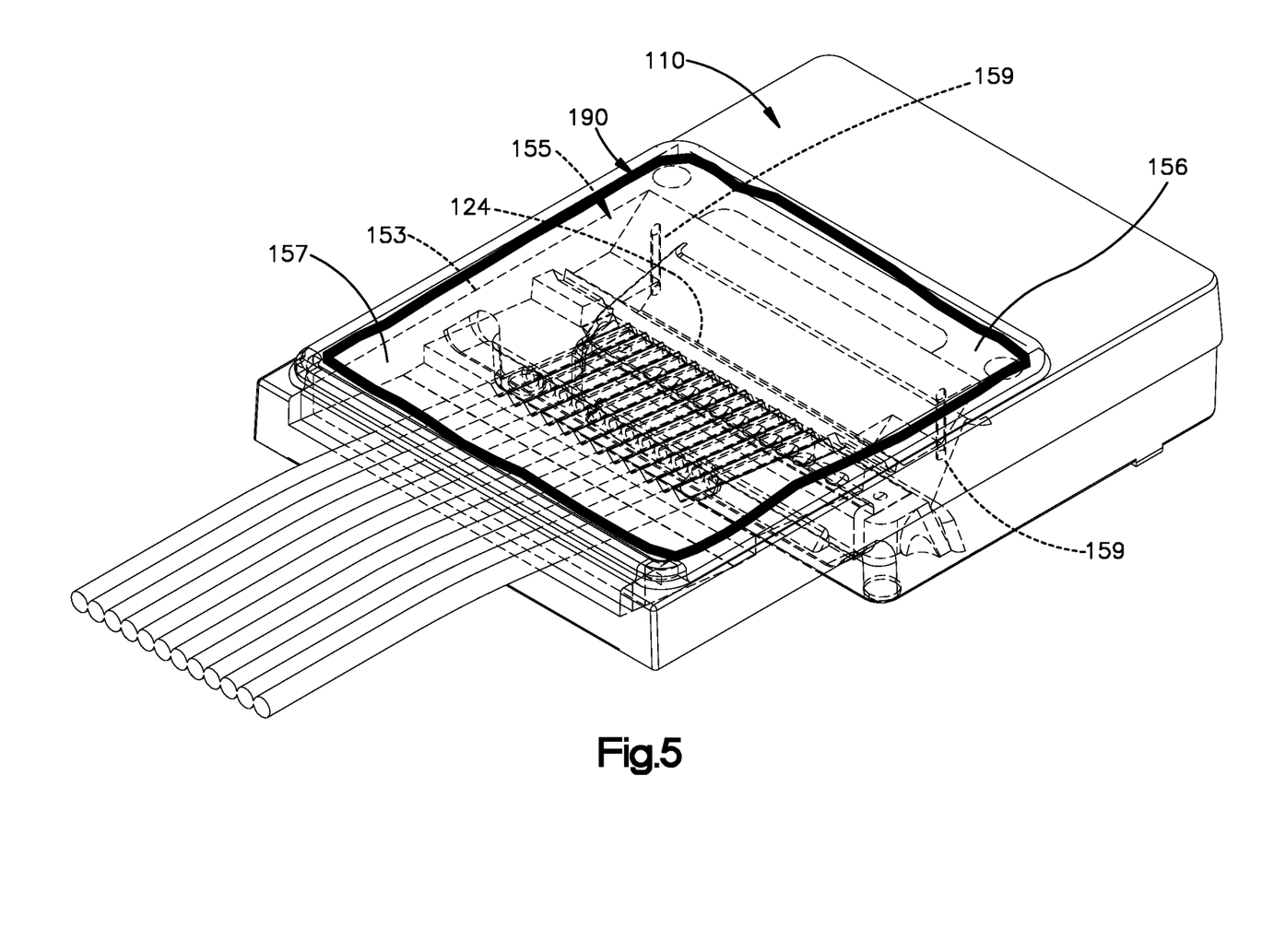
FIG. 5 shows a first cavity seal of the sealed optical receiver illustrated in FIG. 3A.

Referring now to FIG. 5, and as described above, the upper end of the at least one conduit 159 can be sealed with respect to fluid flow. In particular, at least one closure member 156 can extend over the opening 153 of the first cavity 155, thereby isolating the at least one conduit 159 from the ambient environment. In one example, the closure member 156 can be configured as a plate 157 that is secured to the top surface of the optical block 110. The closure member 156 can extend over at least a portion of the first cavity 155. Thus, the closure member 156 can isolate the transceiver optical path 150 (see FIG. 2) from contaminants or liquids that may be present in the ambient environment. In one example, the closure member 156 can have a coefficient of expansion that is substantially equal (e.g., within 25%) of that of the optical block, thereby avoiding warpage during fabrication of the optical transceiver 100. For example, both the optical block 110 and the plate 157 may be made of Ultem™ material, a polyetherimide commercially available by Aetna Plastics having a place of business in Mantua, Ohio. The closure member 156 covers and seals the opening 153 to the first cavity 155. In this regard, the closure member 156 isolates the first cavity 155 and the component cavity 162, and the at least one conduit 159 from the ambient environment of the transceiver 100.

In one example, an adhesive 190 can secure the closure member 156 to the top surface of the optical block 110. The adhesive 190 can be applied to either or both of the top surface of the optical block 110 and the bottom surface of the closure member 156 that faces the top surface of the optical block 110. The adhesive 190 can be applied as a continuous uninterrupted bead that surrounds an opening to the first cavity 155. The opening can be defined by the top surface of the optical block 110. The closure member 156 can then be mounted onto the top surface of the optical block 110 such that the adhesive 190 is configured to secure the closure member 156 to the optical block 110. After the closure member 156 has been mounted to the optical block 110, the uncured adhesive 190 can be cured by any known method, such as those previously described. The adhesive 190 can be an epoxy in some examples. It can be desirable for the epoxy to be dimensionally stable after curing and resilient in harsh environments.

Referring also again to FIG. 2, when the closure member 156 has been mounted to the optical block 110, and the optical block 110 has been mounted to the riser 108, the first cavity 155, the component cavity 162, and the at least one conduit 159 define a sealed liquid-impermeable enclosed volume 161. The closure member 156 can be sufficiently thin such that is flexible. As a result, the closure member 156 can selectively bow upward or downward as desired so as to equilibrate the pressure within the sealed continuous volume 161 with that of the ambient environment. Limiting the pressure differential between the enclosed continuous volume 161 and the ambient environment reduces the risk of motion of the optical block 110, which could cause misalignment of the optical path 150. For example, the closure member 156 may be substantially 0.005" thick, although thinner and thicker closure members can be used. Such a thin plate may flexible and bow or slightly shift position in response to possible pressure differentials between the sealed continuous volume 161 and ambient environment to minimize that differential. Minimizing the pressure differential between the sealed continuous volume 161 and ambient environment reduces the risk of possible misalignment of the optical path between the electro-optic element 104 and fiber 112. In one example, the closure member 156 can be configured as a plate 157. In one example, the plate 157 can have substantially planar top and bottom surfaces, having the shape of a rectangular parallelepiped. It is recognized, however, that the closure member 156 can define any suitable size and shape as desired. The closure member 156 may be mounted to the optical block 110 such that a gap between the optical block 110 and the sealing member has an impermeable seal surrounding the first cavity 155. While the closure member 156 is secured to the optical block with an adhesive in one example, it should be appreciated that the closure member 156 can be secured to the optical block 110 in accordance with any suitable alternative method as desired.

As described above, the second free space light propagation path can be sealed by sealing the optical block 110 against the riser 108, and sealing the riser 108 against the substrate 102. Further, when the conduit 59 joins the component cavity 162 with the first cavity 155, the second free space light propagation path can be sealed by sealing the first cavity 155. Alternatively or additionally, the second free space light propagation path can be sealed by placing an adhesive in the component cavity 162, such that the adhesive extends from the electro-optic element to the first surface of the optical block 110. The adhesive can be an epoxy. It can be desirable for the epoxy to be optically transparent epoxy or adhesive that seals a gap that extends from the first surface of the optical block 110 to the electro-optic element 104. Thus, the second free space propagation path extends through the adhesive. The optically transparent filler material may be an index matching material such that optical reflections at the electro-optic element 104 and the first surface of the optical block 110 are sufficiently low or minimized. For instance, the optically transparent filler material can have a refractive index between that of the electro-optic element 104 and the optical block 110. The optically transparent filler material is configured to isolate the second free space light propagation path from its surrounding environment. Thus, if the component cavity 162 is not liquid sealed, the optically transparent filler material prevents the liquid that enters the component cavity 162 from interfering with the free space propagation of light in the component cavity 162. Thus, optical signals can propagate through the filler material selectively to the first surface of the optical coupler 110 from the electro-optic element in the transmitter, and from the first surface of the optical coupler 110 to the electro-optic element 104 in the receiver.

Figure 6:
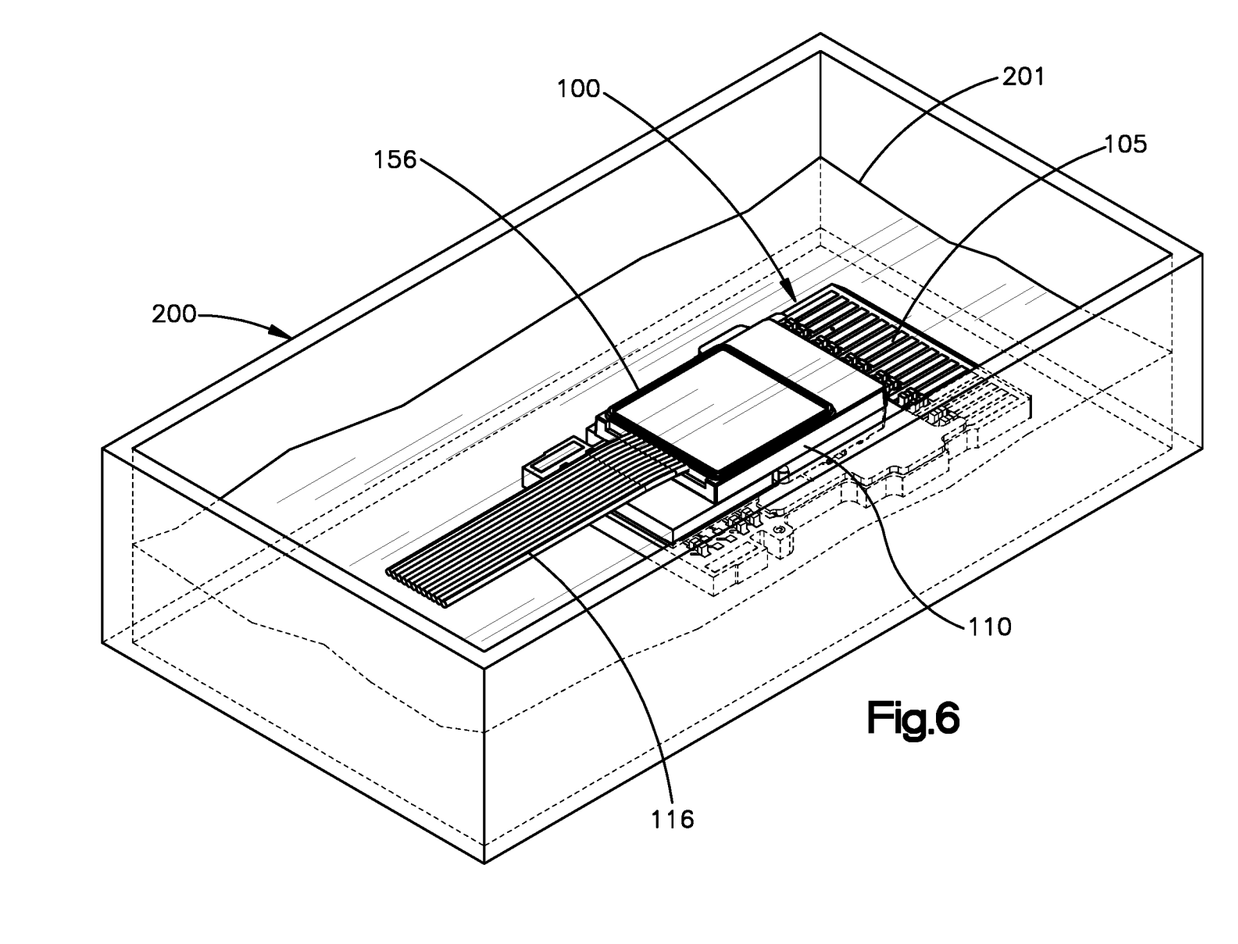
FIG. 6 shows a sealed optical transceiver in operation immersed in a liquid that is disposed in a container.

Referring now to FIG. 6, the sealed optical transceiver 100 can be immersed in a liquid 201 that is disposed in a container 200. The liquid 201 can be a coolant liquid that is configured to remove sufficient heat from the optical transceiver 100 to prevent the optical transceiver 100 from overheating during normal operation. The liquid 201 can be configured as FC-43 liquid, commercially available from 3M Inc. having a place of business in St. Paul, MN The liquid 201 could, of course, be any suitable alternative liquid as desired. The fiber ribbon cable 116 can terminate at an MT ferrule, which can also be immersed in the liquid 201 and still function according to specification. Alternatively, the fiber ribbon cable 116 can emerge from the liquid as it is directed away from the optical block 110.

It is appreciated in some examples that the optical path 150 is sealed from the liquid 201 even though the optical block 110 is not encapsulated water tight housing. Thus, the liquid 201 is able to flow to and contact at least the external surface of the contact block 110. In some examples, the seals of the optical transceiver 100 prevent the liquid 201 from entering the first cavity 155 and the component cavity 162. Alternatively, in some examples described above, the liquid 201 can further be able to flow into the first cavity 155. Alternatively or additionally, the liquid 201 can be able to flow into the component cavity 162. In all examples, the liquid can be prevented from flowing into the optical path 150, thereby affecting the free space propagation of the light traveling along the optical path 150.

It has been observed that the optical transceiver 100 can be subject to 2000 hours of continuous immersion in the liquid 201 without any noticeable performance degradation of the sealed optical transceiver 100. In addition, the optical transceiver 100 has passed the following the standard test of over pressure to 60 PSI, whereby the optical transceiver 100 is placed into a pressure chamber that is pressurized to 60 PSI to evaluate passively the integrity of the seals described herein. Further, the optical transceiver 100 was tested at 35 PSI by applying active pressure. In other words, the transceiver 100 is placed into a pressure chamber that is pressurized to 35 PSI and the transceiver 100 is activated and undergoes normal operation in the pressurized chamber. The optical transceiver has further been found to achieve sufficient radio frequency (RF) and optical performance. The optical transceiver 100 is further configured to be stored at low temperatures that can range down to −55 degrees Celsius. Further still, operation of the optical transceiver 100 was unaffected over the course of 100 temperature cycles from minus 45 degrees Celsius to 85 degrees Celsius.

While the sealed optical transceiver 100 may be immersed in a liquid during operation, this is not a requirement. The sealed optical transceiver 100 may be cooled by forced air flowing over an attached finned heat sink. Alternatively, the optical transceiver may be cooled by contacting it with a liquid cooled chill plate. An advantage of the sealed optical transceiver 100 is that it is insensitive to contaminants that might be present in the surrounding environment. Such contaminants include, but are not limited to, dust and salt water spray.

In some applications, the sealed optical transceiver 100 may be coated with a conformal layer to provide additional environmental isolation. For example, electrical components and/or electrical signal lines that may be present on the substrate 102 may be isolated from the surrounding environment by a conformal coating. Electrical contact areas of the sealed optical transceiver 100 may remain exposed so that electrical connections may be made to the sealed optical transceiver 100. Generally, the conformal coating covering will cover a majority of the exposed surface area of the optical interconnection element. An advantage of the sealed transceiver 100 is that its optical path 150 is isolated from the environmental contamination without use of a costly metal housing or electrical feedthroughs. The conformal coating covering can be a urethane in certain examples.

In other applications, it has been found that an electrically nonconductive lubricant can be applied to exposed, or unsealed, metallic structures of the optical transceiver, such as the electrical contact pads 105, so as to thereby define an electrically nonconductive protective coating. The lubricant can be thixotropic, such that the complimentary electrical component can mate with the electrical contact pads 105, thereby establishing an electrical connection therebetween. Because the optical block 110 is sealed with respect to the ingress of liquid, the lubricant can be applied by immersing the optical transceiver in a bath of the lubricant. Because the optical block 110 is liquid impermeable, the lubricant is applied only to external surfaces of the optical block 110 and of the optical transceiver 100. Alternatively, the lubricant can be sprayed onto a substantial entirety of the optical transceiver 100 or optical block 110. It should be appreciated, of course, that the lubricant can be applied in any suitable manner as desired. Further, the lubricant can alternatively be selectively applied to desired structures to be coated with the lubricant. The lubricant can be anti-corrosive so as to prevent the metallic surfaces coated with the lubricant from corroding in the presence of salt spray, fog, and high humidity such as 95% humidity. Further, the lubricant can prevent fungus from growing on the underlying structures that are coated with the lubricant.

It should be noted that the illustrations and discussions of the embodiments shown in the figures are for exemplary purposes only and should not be construed as limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Various orientation terms, such as top, bottom, upper, and lower, such be understood as relative to a typical orientation of the transceiver with the transceiver substrate resting on a horizontal surface.

What is claimed:

1. An optical interconnection element comprising;
an optical block having an internal light propagation path;
an electro-optic element; and
a component cavity that extends from the optical block to the electro-optic element, wherein a free space light propagation path extends through the component cavity and is optically aligned with the internal light propagation path in the optical block and with the electro-optic element, and the free space light propagation path is sealed from an ambient environment such that environmental contaminants external to the optical interconnection element are prevented from reaching the free space light propagation path.

2. The optical interconnection element as in claim 1, wherein the optical block includes a first cavity adjacent a reflective surface and a closure member is mounted to the optical block such that a gap between the optical block and the closure member has an impermeable seal that surrounds the first cavity.

3. The optical interconnection element as recited in claim 2, wherein the closure member is a flexible plate that is configured to bow in response to a pressure differential between the ambient environment and first cavity so as to reduce the pressure differential between the ambient environment and first cavity.

4. The optical interconnection element as recited in claim 2, wherein the optical block comprises a conduit that places the component cavity in fluid communication with the ambient environment, and further places the component cavity and the first cavity in fluid communication with each other, so that the conduit, component cavity, and first cavity combine to define a sealed liquid-impermeable enclosed volume.

5. The optical interconnection element as recited in claim 4, wherein the conduit places the component cavity in fluid communication with the ambient environment without passing through the first cavity.

6. The optical interconnection element as recited in claim 1, further comprising;
a substrate;
a riser mounted on the substrate, the riser having a riser hole, wherein the electro-optic element is mounted on the riser adjacent the central riser hole; and
a seal that extends between the riser and the substrate, wherein the seal surrounds the riser hole so as to prevent ambient liquid from entering the riser hole through the gap.

7. The optical interconnection element as recited in claim 6, wherein the optical block is mounted to the riser and a gap between the optical block and the riser has an impermeable seal that surrounds the component cavity.

8. The optical interconnection element as recited in claim 1, wherein the electro-optical element has a conformal coating covering a majority of the exposed surface area of the optical interconnection element.

9. An optical interconnection element comprising;
an optical block having a first cavity; and
a closure member; wherein a gap between the optical block and the closure member has an impermeable seal surrounding the first cavity,
wherein the optical block has a first light propagation section which is redirected by a reflective surface adjacent the first cavity, and
wherein the optical interconnection element further comprises a second light propagation section that extends through a component cavity in the optical block and is optically aligned with the first light propagation section, wherein the second light propagation section extends along a different direction with respect to the first light propagation section.

10. The optical interconnection element as recited in claim 9, wherein the optical block has a conduit that places the component cavity and the first cavity in fluid communication with each other so that the conduit, the component cavity, and the first cavity combine to define a sealed liquid-impermeable enclosed volume.

11. The optical interconnection element as recited in claim 9, wherein a free space light propagation path is disposed in the component cavity that is sealed from an ambient environment.

12. The optical interconnection element as recited in claim 9, wherein the reflective surface comprises a metallic surface.

13. The optical interconnection element as recited in claim 9, wherein the reflective surface comprises a TIR surface.

14. The optical interconnection element as recited in claim 9, further comprising an electro-optic element that is aligned with the second light propagation section, wherein the component cavity extends from the optical block to the electro-optic element.

15. An optical interconnection element comprising:
an optical block;
an optical fiber that extends through an opening of the optical block and into a first cavity;
an electro-optic component supported relative to the optical block, wherein light undergoes free space propagation along at least a portion of an optical path that extends between an end face of the optical fiber and the electro-optic component,
wherein when the optical interconnection element is immersed in a liquid, the liquid contacts an external surface of the optical block and is prevented from flowing into the optical path.

16. The optical interconnection element as recited in claim 15, wherein the optical path defines a first free space light propagation path of the optical path, wherein the first free space light propagation path extends between the end face of the optical fiber and the contact block.

17. The optical interconnection element as recited in claim 16, wherein the end face of the optical fiber is disposed in a first cavity of the optical block, and the liquid is prevented from traveling into the first cavity.

18. The optical interconnection element as recited in claim 16, wherein the end face of the optical fiber is disposed in a first cavity of the optical block, and the liquid entering the first cavity is prevented from traveling into the first free space light propagation path.

19. The optical interconnection element as recited in claim 15, wherein the optical path defines a second free space light propagation path of the optical path, wherein the first free space light propagation path extends between a surface of the optical block and the electro-optic element.

20. The optical interconnection element as recited in claim 19, wherein the optical block defines a second cavity that extends between the surface of the optical block and the electro-optic element, the second free space light propagation path extends through the second cavity, and the liquid is prevented from traveling into the first cavity.

21. An optical interconnection element comprising;
a riser mounted on a substrate;
an electro-optic element mounted on the riser; and
an optical block mounted to the riser, wherein a component cavity extends from the optical block to the riser and also to the electro-optic element that is mounted on the riser,
wherein a portion of the optical block is coated with a metallic coating so as to define a metallic reflective surface,
wherein a liquid impermeable seal is disposed in a gap between the optical block and the riser, and the liquid impermeable seal also surrounds the component cavity, and
wherein the optical interconnection element defines an optical path between a fiber end face and the electro-optic element and the optical path defines a first section that extends from the fiber end face to the metallic reflective surface, and a second section that extends from the metallic reflective surface to the electro-optical element.

22. An optical interconnection element as recited in claim 21, wherein reflection off the metallic reflective surface is not spoiled by liquid contacting the metallic reflective surface.

23. The optical interconnection element as recited in claim 21, wherein the second section defines a free space light propagation path that is isolated from environmental contaminants.

24. The optical interconnection element as recited in claim 21, further comprising an adhesive bead that is disposed between the optical block and the riser.

* * * * *